US007459049B2

(12) United States Patent
Marschke

(10) Patent No.: US 7,459,049 B2
(45) Date of Patent: Dec. 2, 2008

(54) METHOD AND APPARATUS FOR MANUFACTURING OPEN CORE ELEMENTS FROM WEB MATERIAL

(76) Inventor: Carl R. Marschke, W5718 County Rd. H, Phillips, WI (US) 54555

( * ) Notice: Subject to any disclaimer, the term of this patent is extended or adjusted under 35 U.S.C. 154(b) by 357 days.

(21) Appl. No.: 11/476,474

(22) Filed: Jun. 28, 2006

(65) Prior Publication Data

US 2008/0000580 A1 Jan. 3, 2008

(51) Int. Cl.
*B29C 65/54* (2006.01)
*B32B 37/02* (2006.01)
*B32B 38/04* (2006.01)

(52) U.S. Cl. ....................... 156/182; 156/207; 156/196; 156/210; 156/250; 156/259; 156/260; 156/271; 156/290; 156/291; 156/307.3; 83/52

(58) Field of Classification Search ................. 156/182, 156/196, 207, 210, 250, 259, 260, 271, 290, 156/291, 307.3; 83/52
See application file for complete search history.

(56) References Cited

U.S. PATENT DOCUMENTS

| | | | | |
|---|---|---|---|---|
| 3,434,901 | A * | 3/1969 | Griffiths et al. | 156/210 |
| 3,707,817 | A | 1/1973 | Schmitt et al. | |
| 3,943,994 | A * | 3/1976 | Cleveland | 165/10 |
| 4,012,276 | A * | 3/1977 | Schertler | 156/558 |
| 4,126,508 | A * | 11/1978 | Hoelzinger | 156/512 |
| 4,500,381 | A * | 2/1985 | Nordstrom | 156/205 |
| 4,948,445 | A * | 8/1990 | Hees | 156/196 |
| 5,674,593 | A * | 10/1997 | Earl | 428/182 |
| 5,992,112 | A | 11/1999 | Josey | |
| 6,253,530 | B1 | 7/2001 | Price et al. | |
| 6,405,509 | B1 | 6/2002 | Razl | |
| 6,467,223 | B1 | 10/2002 | Christley | |
| 6,711,872 | B2 | 3/2004 | Anderson | |
| 6,800,351 | B1 * | 10/2004 | Pflug et al. | 428/73 |
| 6,890,398 | B2 * | 5/2005 | Sing | 156/254 |
| 6,913,667 | B2 * | 7/2005 | Nudo et al. | 156/254 |
| 2002/0062611 | A1 | 5/2002 | Pryor | |
| 2002/0069993 | A1 * | 6/2002 | Gilgen | 162/298 |

FOREIGN PATENT DOCUMENTS

| | | |
|---|---|---|
| FR | 1212042 | 3/1960 |
| FR | 1373515 | 9/1964 |
| GB | 783362 | 9/1957 |

(Continued)

OTHER PUBLICATIONS

International Search Report dated Jan. 15, 2008.

(Continued)

*Primary Examiner*—Philip C Tucker
*Assistant Examiner*—Sing P Chan
(74) *Attorney, Agent, or Firm*—Andrus, Sceales, Starke & Sawall, LLP

(57) ABSTRACT

A continuous, fully automated and highly productive system for the production of open core elements utilizes various formations of fluted input webs which are cut into strips, glued, cross-transferred, and serially upended for placement against preceding strips to build up an open core element. The open core elements are useful in the manufacture of structural members such as doors, floor panels and all panels.

20 Claims, 11 Drawing Sheets

FOREIGN PATENT DOCUMENTS

| | | | |
|---|---|---|---|
| GB | 1428268 A | * | 3/1976 |
| GB | 1444346 | | 7/1976 |

OTHER PUBLICATIONS

Ruzzene, Massimo et al, Control of Wave Propagation in Sandwich Plate Rows with Periodic Honeycomb Core; Journal of Engineering Mechanics; Sep. 2003; pp. 1-12.

Wadley, Haydn N.G. et al, Fabrication and structural performance of periodic cellular metal sandwich structures; Composites Science and Technology, vol. 63, 2003, pp. 2331-2343.

Zupan, M. et al, The out-of-plane compressive behaviour of woven-core sandwich plates; European Journal of Mechanics A/Solids, vol. 23, 2004, pp. 411-421.

Paper-Honeycomb Cores for Structural Sandwich Panels by Robert J. Seidl; Report No. 1918, Jul. 1956; United States Department of Agriculture Forest Services.

National Advisory Committee for Aeronautics; Technical Note 2564; Properties of Honeycomb Cores as Affected by Fiber Type, Fiber Orientation, Resin Type, and Amount by R.J. Seidl, D.J. Fahey and A.W. Voss; Forest Products Laboratory.

* cited by examiner

METHOD AND APPARATUS FOR MANUFACTURING OPEN CORE ELEMENTS FROM WEB MATERIAL

BACKGROUND OF THE INVENTION

The present invention pertains light weight open core materials having a honeycomb-like structure useful in a number of applications where light weight core elements are desirable or necessary.

It has long been known to utilize honeycomb core materials in the manufacture of structural members such as doors, wall panels and floor panels. The honeycomb core material may be made from paper, metal or even plastic web material. Conventional honeycomb construction may utilize paper strips laid together in a stack and connected to one another with intermittent lengths of adhesive, and then expanded or opened to form a hexagonal honeycomb core element. It is also known to use corrugated paper or metal webs either with or without smooth facing webs which are stacked and glued together, again resulting in an open core structure.

Although honeycomb-type core elements have long been proposed for use in structural panels, one reason for the lack of significant development of this use is the absence of a high speed process for making and assembling multi-layer honeycomb core elements. Also, when open core elements are made with conventional corrugated paper webs, conventional corrugating techniques and machinery are typically limited to flute sizes that are unnecessarily small for making open core elements for use in structural members. The inability to control thickness as well as the width of the expanded core material has been a problem.

SUMMARY OF THE INVENTION

The present invention comprises a fully automated and highly productive method and apparatus for the continuous manufacture of open core elements using fluted web material of various kinds and with or without intermediate smooth web materials.

In one embodiment, the method of the present invention includes the steps of (1) forming two composite web halves, each comprising a smooth web and a fluted web, (2) orienting the composite web halves with the exposed fluted web flutes facing up, (3) applying an adhesive to the exposed flute tips of one of the web halves, (4) adhering the other web half by its smooth web to the glued flute tips of the one web half to form an open face double wall web, (5) slitting the open face double wall web longitudinally to form a plurality of adjacent equal width open face double wall strips, (6) applying an adhesive to the exposed flute tips of the strips, (7) cutting the strips transversely to a selected common length, and (8) upending the strips onto common lateral strip edges and adhering the adhesively glued flutes of each strip to the smooth web of the next adjacent strip to form the open core element.

The foregoing method preferably includes, prior to the step of adhering the two web halves, the step aligning the flute tips of the web halves tip-to-tip. The method may also include, after the step of adhering the two web halves, the step of heating the open face double wall web to cure the adhesive. Preferably, the method includes, prior to the upending step, the steps of (1) accelerating the strips to form a gap between said strips and the next following plurality of strips, and (2) cross-transferring the strips out of the path of the next following plurality of strips. The method also preferably includes the additional step of applying a normal force to the upended and adhered strips.

The method may also include the step of cutting the completed open core element to a selected size. The cutting comprises one or both of the steps of (1) cutting one edge of the core element in the longitudinal direction of the strips, and (2) cutting one end of the core element in a direction transverse to the strips.

In one embodiment of the method of the present invention each of the composite web halves is formed separately. In this embodiment, the webs are formed with the fluted web flutes facing downwardly and the webs are reoriented before applying the adhesive to position the flutes to face upwardly. In a variation of the basic method the composite web halves are formed by (1) forming a double width composite web, and (2) slitting the double width web to form the two composite web halves.

A somewhat more basic method of the present invention includes the steps of (1) forming a composite web from at least one smooth web and a fluted web, (2) orienting the composite web with the flutes facing up, (3) slitting the web longitudinally to form a plurality of adjacent equal width strips, (4) applying an adhesive to the exposed flute tips of the strips, (5) cutting the strips transversely to a common selected length, and (6) upending the strips onto common lateral edges and adhering the adhesively glued flutes of each strip to the smooth web of the next adjacent strip to form the open core element.

In a variation of the foregoing method, there are performed the steps of (1) eliminating the application of adhesive to a lead strip for a strip group of a selected number of strips, (2) supporting the upended lead strip on its unglued face, and (3) pressing the subsequent upended strips of the group against the lead strip. The method may also include the step of orienting the upended strips to form a downwardly directed core element. The method may also include the step of inserting a weighted strip on the upper end strip of each core element. Prior to the upending step, method may include the step of aligning the flute tips on adjacent strips tip-to-tip.

The forming step may comprise forming two composite webs, and joining said webs to form an open face double wall web. In this variation, the method includes the preliminary steps of (1) forming a double width composite web, and (2) slitting the double width web to form the two composite webs. Alternately, said composite webs may be formed separately. When formed separately, the webs are formed with the fluted web flutes facing downwardly, and the method includes the step of reorienting the webs before joining to position the flutes to face upwardly.

DETAILED DESCRIPTION OF THE PREFERRED EMBODIMENTS

Figure 1:
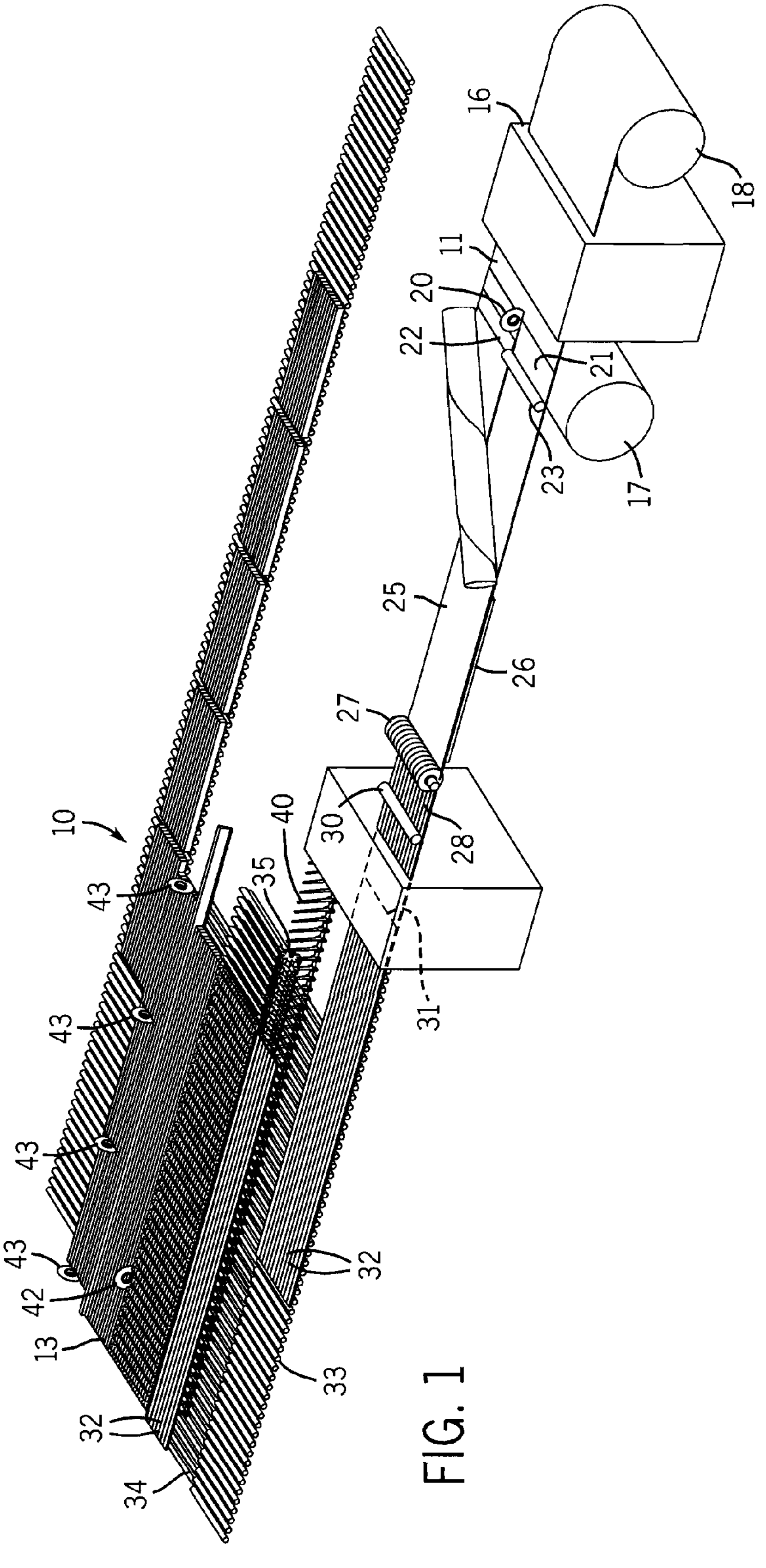
FIG. 1 is a perspective view of a system for the continuous manufacture of open core elements utilizing one embodiment of the method of the present invention.
Figure 2:
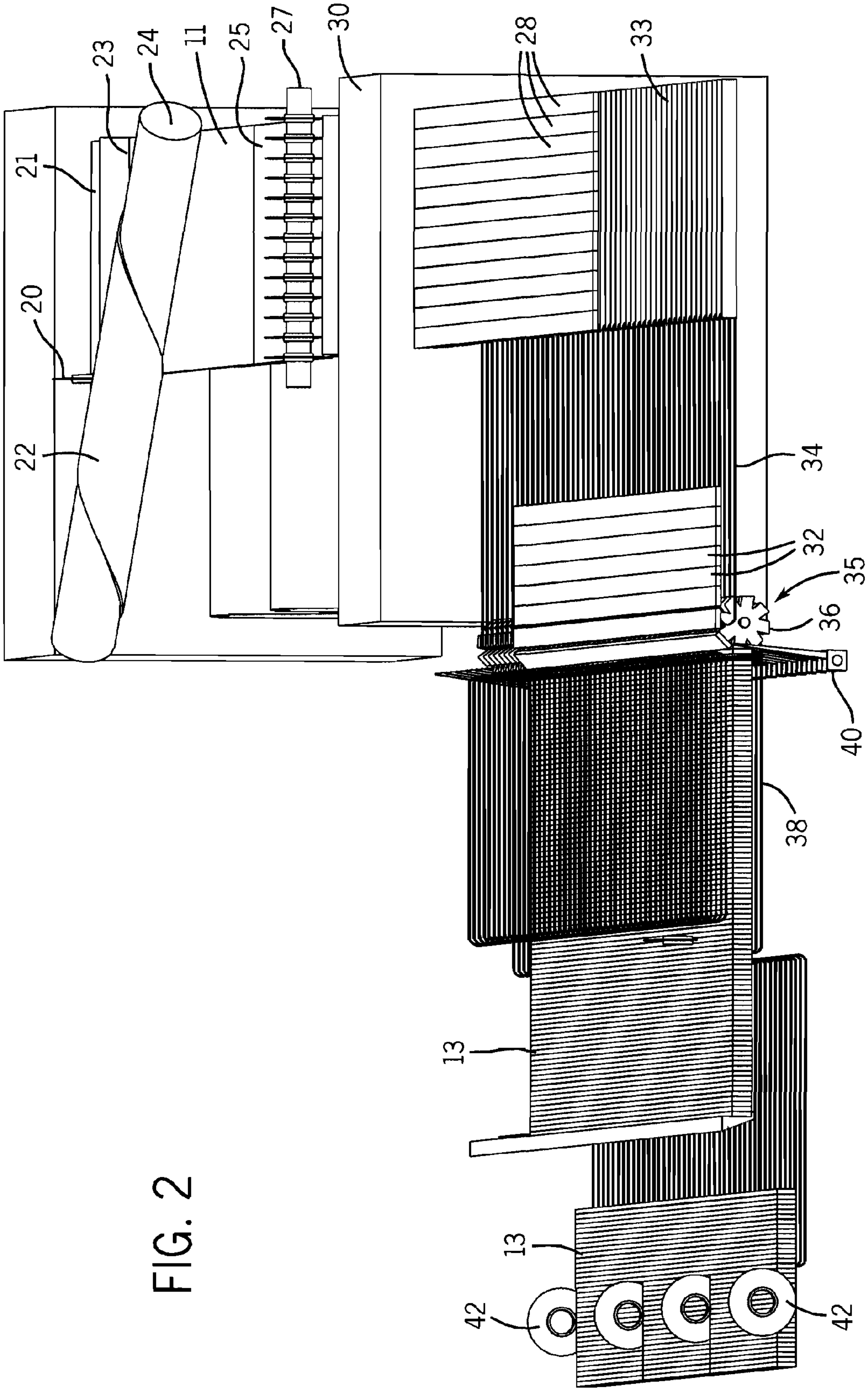
FIG. 2 is a top plan view of the system shown in FIG. 1.
Figure 3:
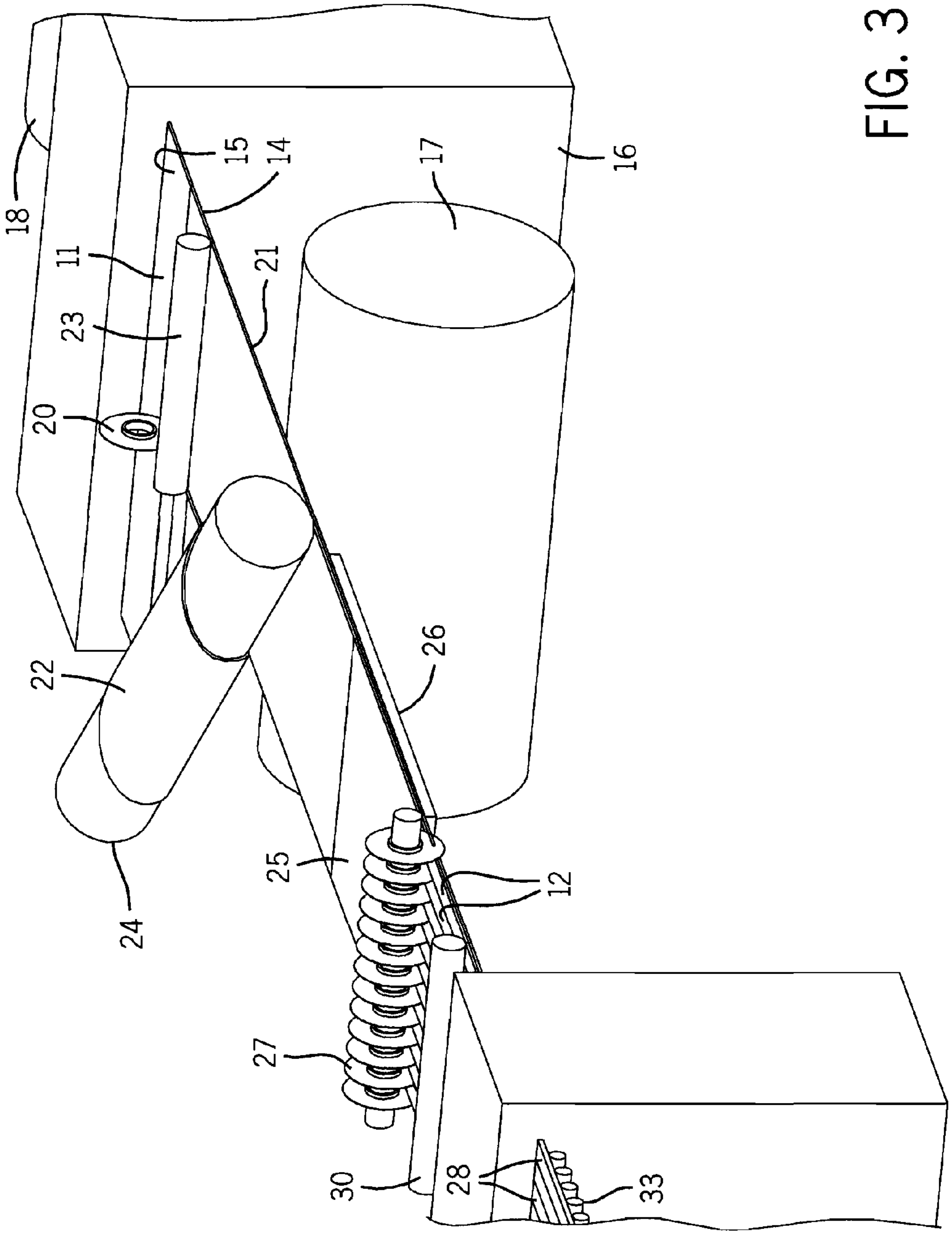
FIG. 3 is a perspective view of an upstream portion of the FIG. 1 system showing one embodiment of an apparatus for forming the composite web.

Referring initially to FIGS. 1 and 3, a core element lay up system 10 utilizes core element components made from a composite web 11 which is converted to form strip like elements (28) which are, in turn, joined to form a core element 13. In the embodiment of the invention shown, a double width composite web 11 is formed by joining a smooth web 14 and a fluted web 15 utilizing any of a number of prior art techniques. For example, the webs 14 and 15 could be formed and glued together in a single facer 16 in a manner well known in the corrugating industry. A smooth web from a supply roll 17 is fluted under heat and pressure in the single facer 16, glue is applied to the flute tips on one side of the fluted web 15, and the fluted web is then joined to the smooth web 14 from the supply roll 18.

The composite web 11 is formed (or reoriented after forming) with the fluted web component 15 facing upwardly. As the composite web 11 exits the single facer 16, it is slit longitudinally on its centerline by a slitting blade 20 to form two web halves 21 and 22. A suitable glue or adhesive is applied to the flute tips of the lower web half 21 by a glue roll 23. The other web half 21 is directed onto an angled turning bar 24 around which it is wrapped and displaced laterally to bring it into contact with the glued web half 21 where the smooth web face of the web half 22 is laid onto the glued flute tips of the other web half 21 to form an open face double wall web 25. The double wall web 25 is directed over a heating plate 26 or other heating device to cure the adhesive and permanently join the two web halves 21 and 22. As will be described in greater detail below with respect to the presently preferred embodiment, the flutes of the two component webs forming the open face double wall web 25 are brought together and joined so that the flutes of the two component webs are in flute tip-to-flue tip alignment.

The open face double wall web 25 is then slit longitudinally with a multi-blade slitter 27 to form a plurality of equal width open face double wall strips 28. The open face double wall web 25 has an upper exposed fluted face and, therefore, the strips 28 also have laterally extending flutes. The strips then pass beneath a second glue roll 30 which applies a suitable adhesive to the exposed flute tips. When the plurality of strips 28 reaches a selected length in the machine direction, a cut-off knife 31 downstream of the glue roll cuts the strips 28 to a common length. The strips are preferably cut at the bottom of the next flute which will provide a core element just slightly larger than the desired length. The plurality of glued and cut strips 32 is accelerated on a transport conveyor 33 to form a gap between the strips and the next-following uncut strips.

Figure 4:
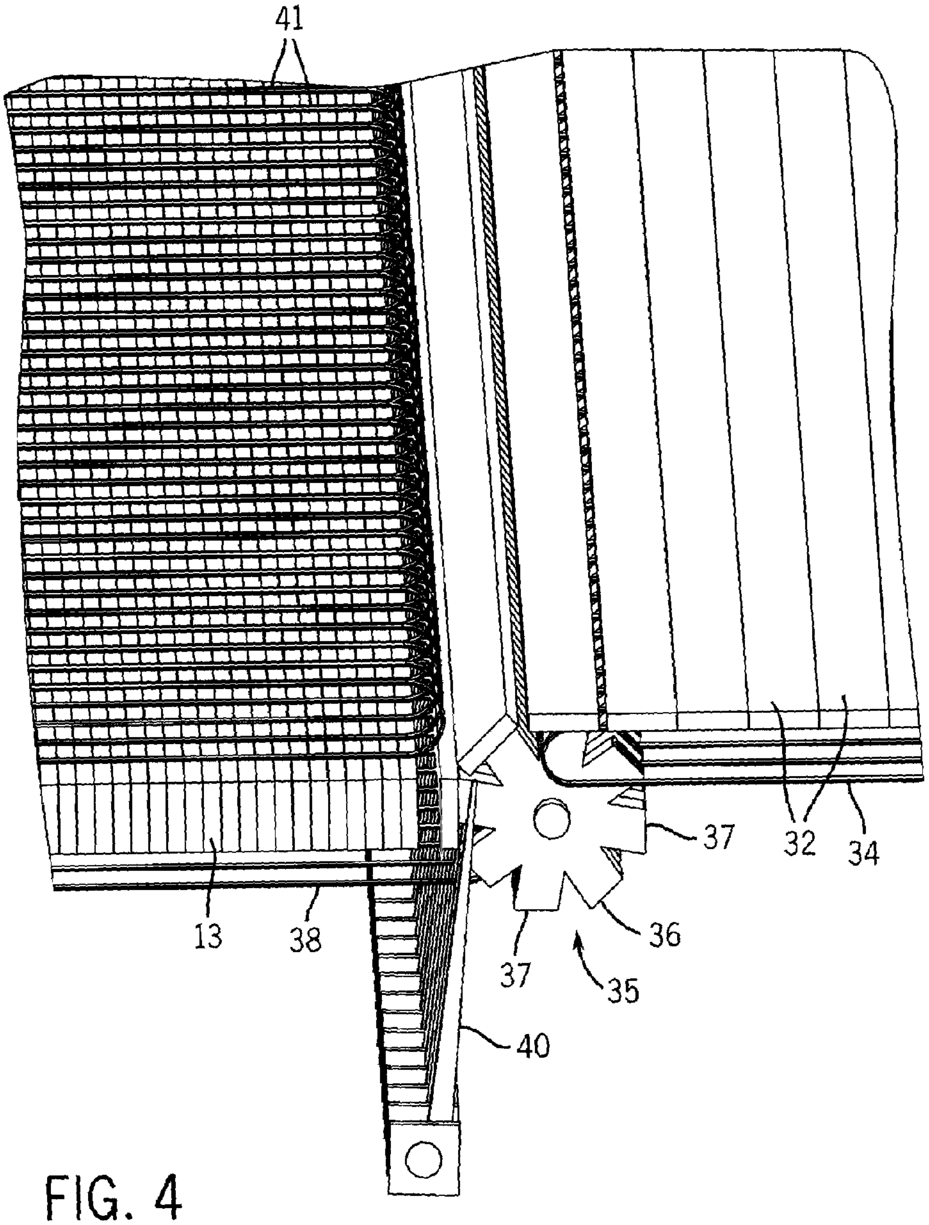
FIG. 4 is a perspective view of an intermediate downstream portion of the system showing the incremental formation of core elements.

The plurality of glued and cut strips 32 is then cross-transferred out of the machine direction path of the next following plurality of strips and onto a lateral feed conveyor 34 to a strip upender 35. As is best seen in FIG. 4, an upender roll 36 has a series of circumferentially spaced vacuum headers 37 that serially capture each glued and cut strip to reorient the strip from a horizontal to a vertical position such that succeeding strips are deposited on common lateral strip edges and in face to face relation with each strip that precedes it. In this orientation, the glued flutes of each strip face the smooth web face of the preceding strip and, when deposited on the element forming conveyor 38, are brought into adhesive contact. As can be seen in FIG. 4, the flutes on the strips extend vertically and together comprise a core element 13. To facilitate removal of each strip 28 from the vacuum header 37 on the upender roll 36, each vacuum header includes a series of laterally spaced vacuum ports between which the tines of a discharge fork 40 extend. The fork is operable to engage the unglued smooth face of each strip and push it into contact with the preceding strip on the element forming conveyor as the vacuum is released. The discharge fork is then returned to its discharge position for the next following strip.

In this embodiment, as the core element 13 is being formed, a set of conveyor belts 41, positioned over the top of the core element, applies a normal force to assist in compacting the core element and press the glued flute tips of each strip to the smooth face of the preceding strip by running slightly faster than the advancing core block which is held back by downstream holding rolls.

Figure 5:
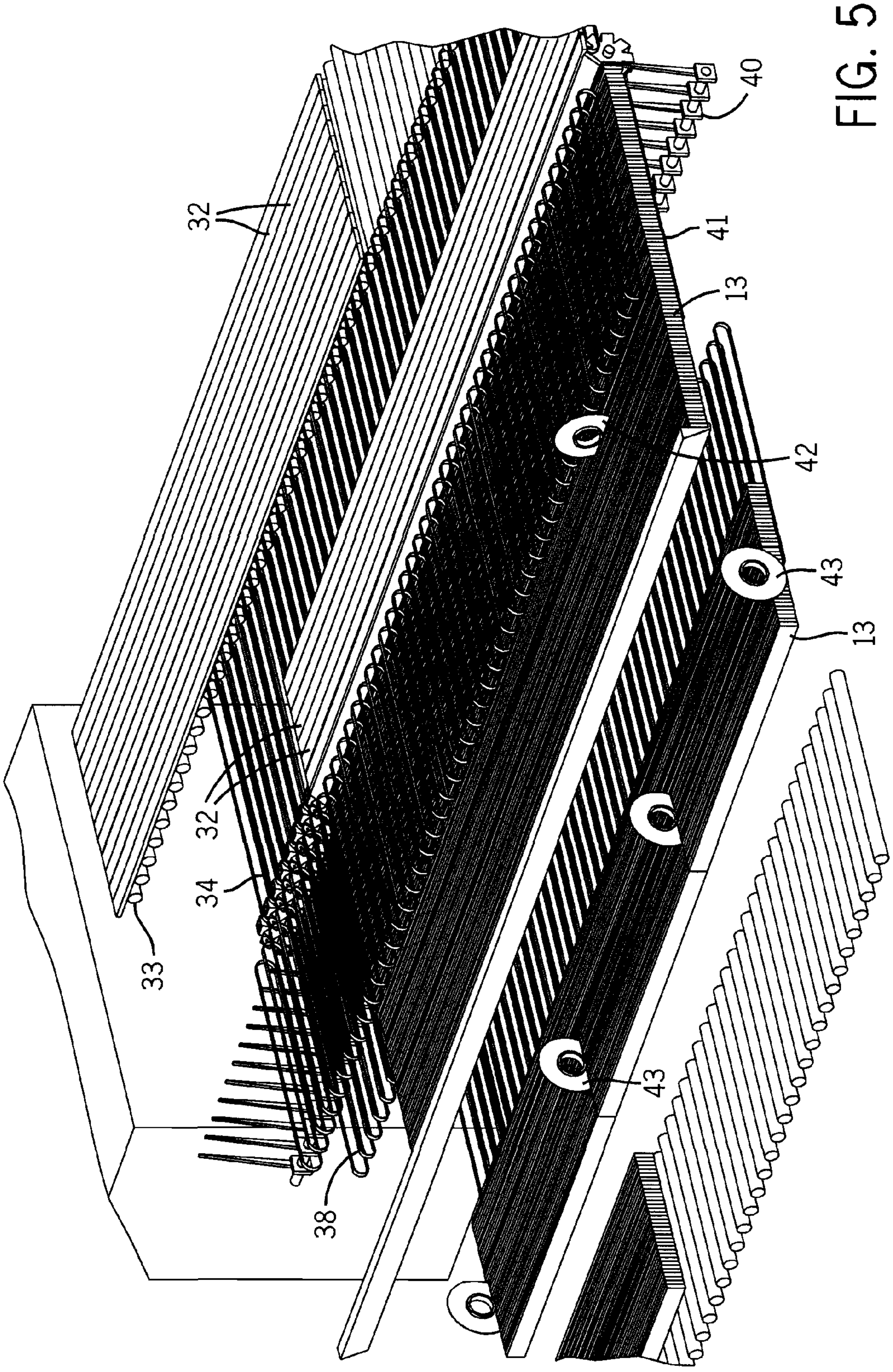
FIG. 5 is a perspective view of the downstream portion of the system shown in FIG. 1.

When a core element 13 comprising a desired number of strips has been formed, the core element 13 is accelerated into a trim and cut station where it can be cut into any number of smaller core elements. In the example shown in FIG. 5, the large formed core element 13 is trimmed longitudinally (in the longitudinal direction of the strips 28) with a trim blade 42 to a selected edge dimension. The trimmed element 13 is then moved to a cutting position where a series of cutting blades 43, including an edge trim blade, cuts the long core element into final element sizes. For example, if the final core elements are to be used in the manufacture of hollow-core doors, the strips 28 could be cut to lengths of 240", upended and stacked to a core width of 30" and finally trimmed and cut to provide three door pieces each 80"×30".

The height or thickness of the core element 13 depends on the width to which the strips 28 are slit. The length of the core element 13 can be varied as desired. Thus, the system has the capability of continuously and rapidly forming core elements of widely varying dimensions.

Composite fluted webs, useful in forming core elements, can be made in a number of different ways, can utilize different kinds of web materials, and the fluted web can be formed in various ways. As indicated above, it is preferable to utilize a flute size for the fluted web that is larger than flutes commonly made on a typical single facer. A larger flute size will provide adequate strength for the core element, but utilize significantly less paper or other web material in the formation of the fluted web.

Figure 6:
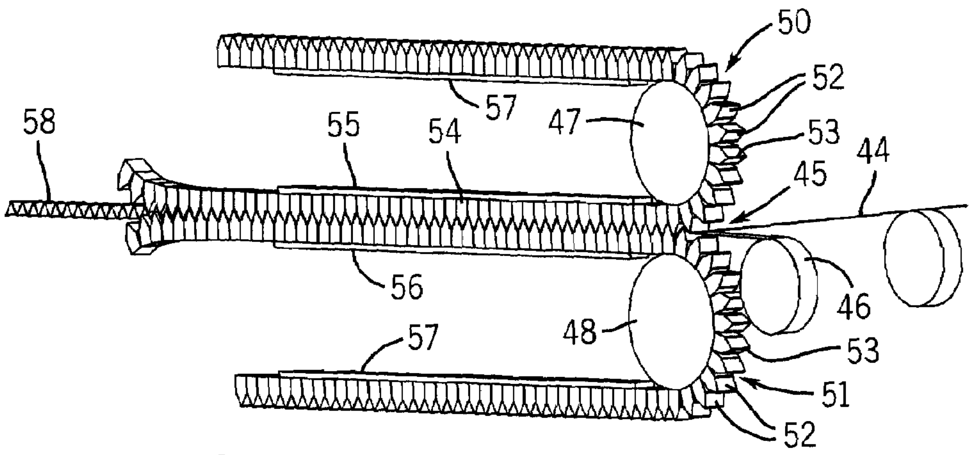
FIG. 6 is a perspective view of an apparatus for forming an all-fluted composite web.

Referring to FIG. 6, an alternate apparatus utilizing an alternate flute forming method is shown. In the embodiment shown, a composite web is made by simultaneously fluting two incoming webs which may be made of the same or different materials. If, for example, two paper webs are utilized, an upper web 44 has a layer of glue, such as a starch adhesive, applied to its lower face upstream of a fluting nip 45. A lower web 46 is also fed with the glued upper web 44 into the nip 45 formed at the upper and lower tail sprockets 47 and 48 carrying a pair of intermeshing fluting conveyors 50 and 51. Each of the fluting conveyors 50 or 51 includes a continuous series of fluting bars 52 made, for example, from aluminum extrusions and extending the full width of the incoming webs 44 and 46 (e.g. 96" or about 2440 mm). The fluting bars may be carried on a series of laterally spaced ¾" pitch roller chains with the fluting bars 52 attached thereto with conventional K-1 attachments. The roller chains may, for example, be laterally spaced 16" or about 406 mm apart. Each fluting bar has an exposed flute forming tip 53 that is shaped to form a flute one ½" (about 13 mm) deep and with a pitch of ¾" (about 19 mm) corresponding to the pitch of the carrying roller chains.

As the webs 44 and 46 come into the fluting nip 45, they are simultaneously fluted, one flute at a time, and joined by the adhesive previously applied to the contacting face of one of the webs. The joined webs are held together in a straight fluting run 54 of the fluting conveyors 50 and 51 to which heat is applied by upper and lower heating elements 50 and 51 to bond and cure the adhesive. Each of the fluting conveyors 50 and 51 may include flute pre-heaters 57 to help maintain the temperature of the fluting bars 52. A composite fluted web 58 exits the fluting conveyors 50 and 51 at their head ends where, preferably, the conveyor flights are separated gradually on a much larger radius arc than that of the tail sprockets 47 and 48. The resulting composite fluted web 58 is substantially cured and rigid enough for further processing with or without the addition of a smooth facing web.

A composite fluted web 58 of the foregoing type could, for example, be glued to a smooth web and the web processed to form core elements in the manner previously described. However, the composite fluted web 58 also has utility for other applications, such as a substitute for the ubiquitous styrofoam peanuts used as packaging filler and cushioning material.

Figure 7:
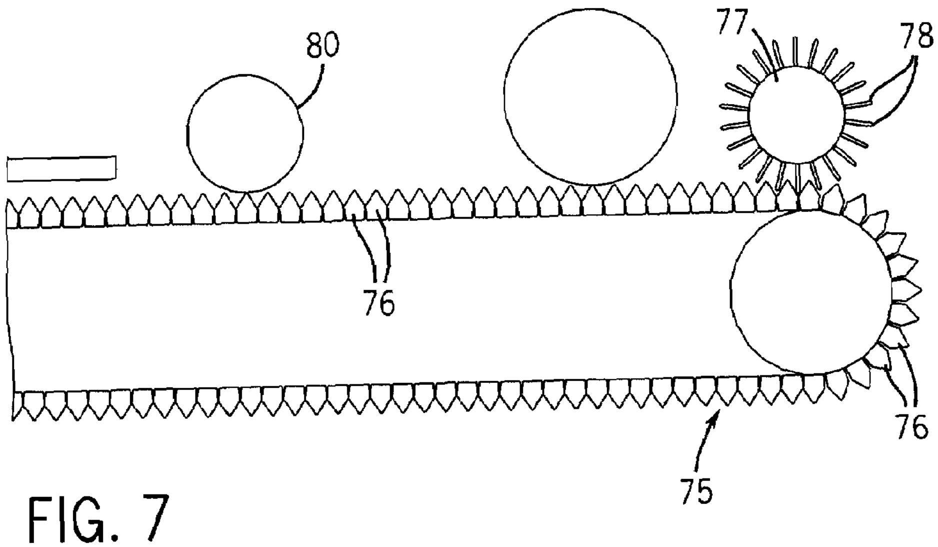
FIG. 7 is a side elevation detail of an alternate flute forming apparatus of a presently preferred construction.
Figure 8:
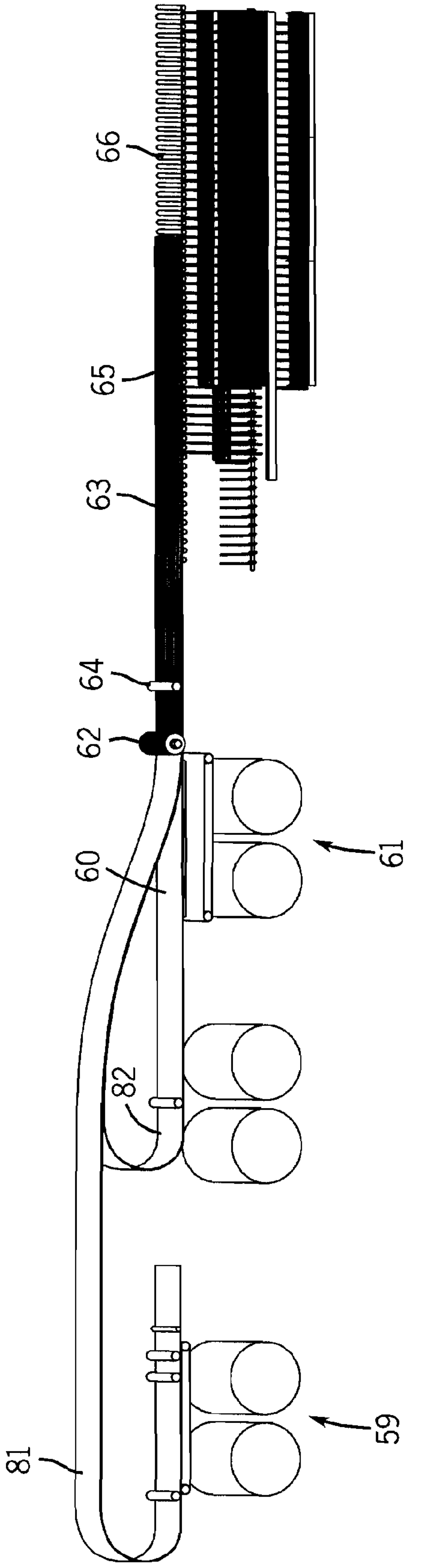
FIG. 8 is a perspective view of an alternate system for the manufacture of open core elements.
Figure 9:
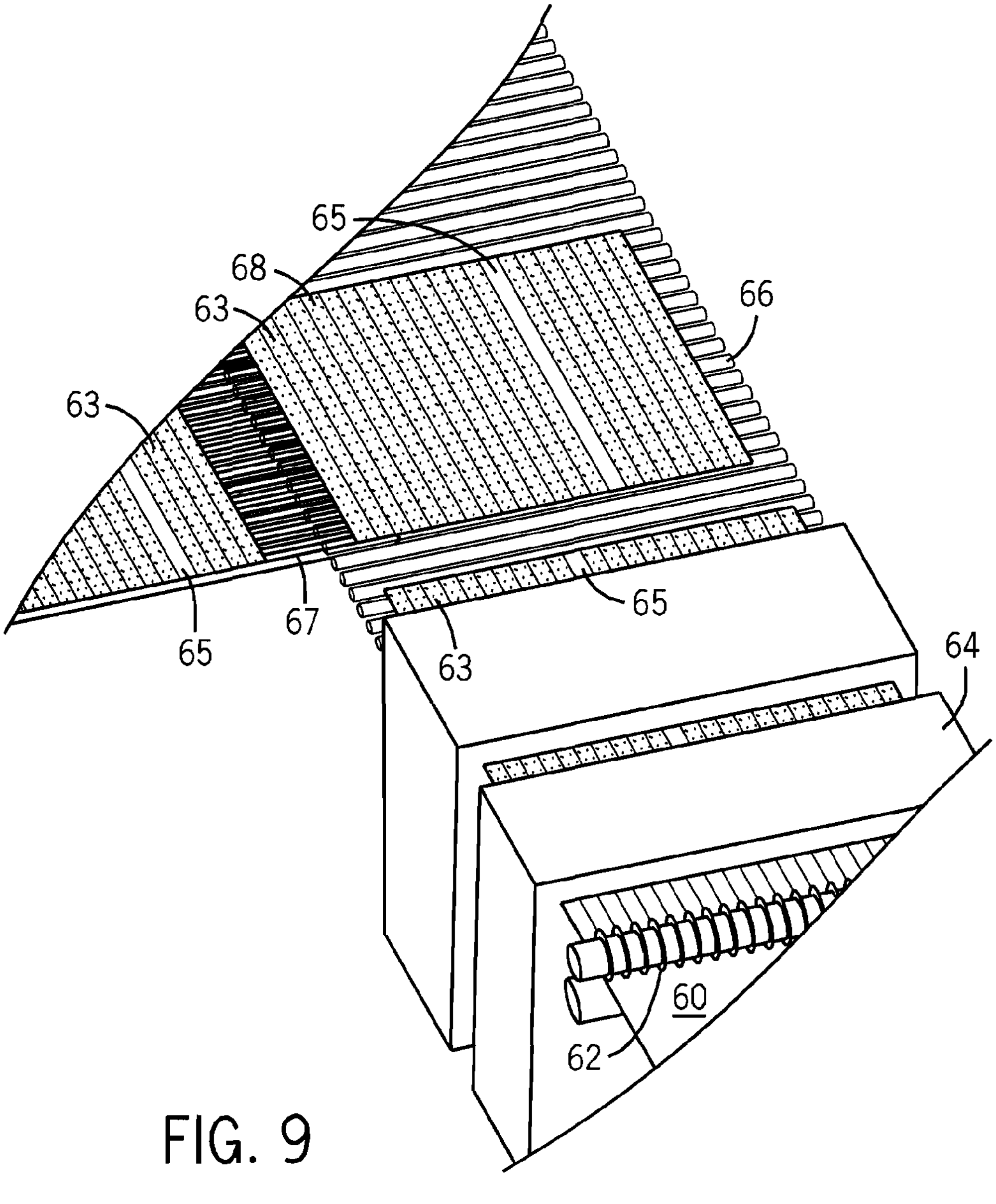
FIG. 9 is a perspective detail of a portion of the system shown in FIG. 8.
Figure 10:
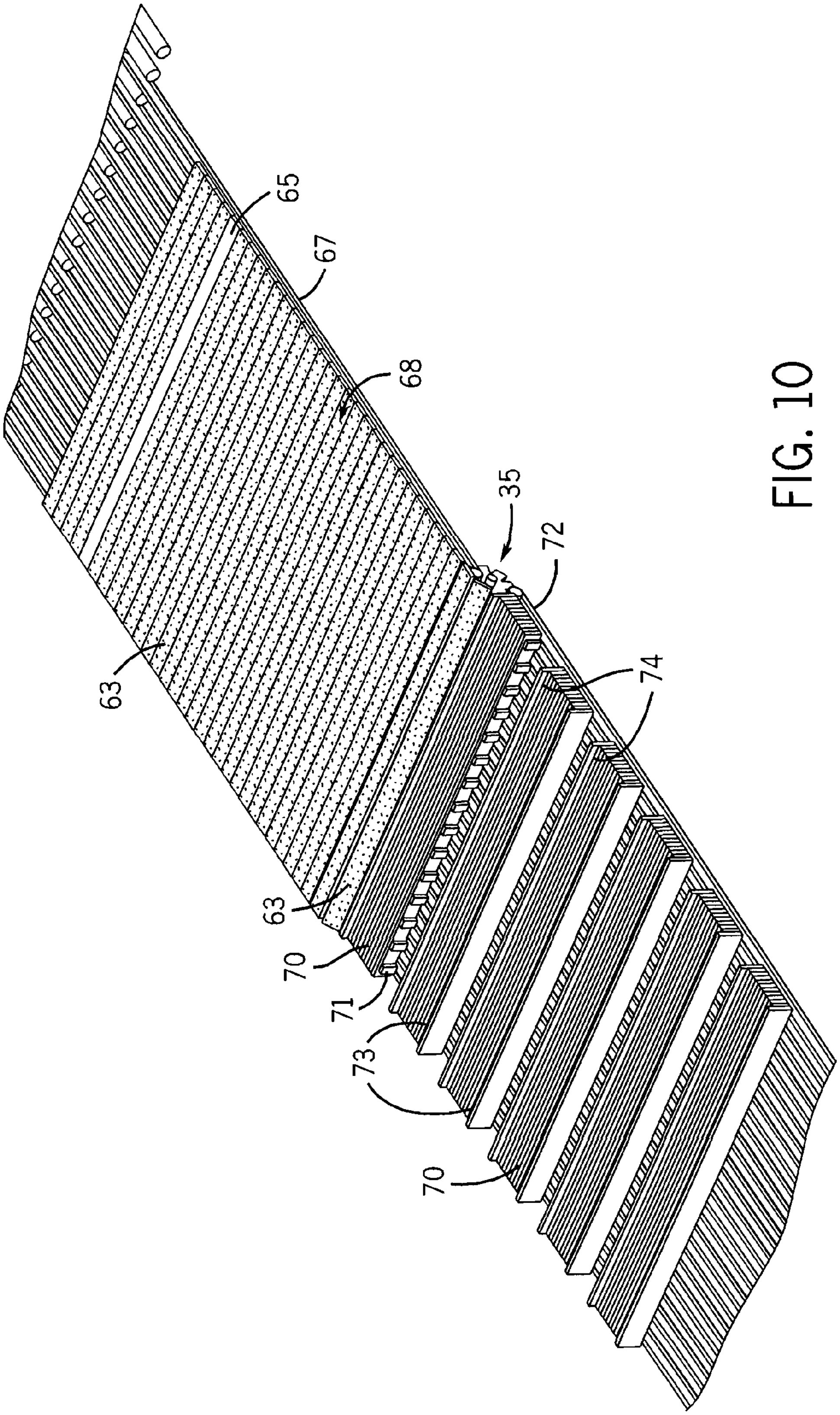
FIG. 10 is a further perspective detail of the system shown in FIG. 8.
Figure 11:
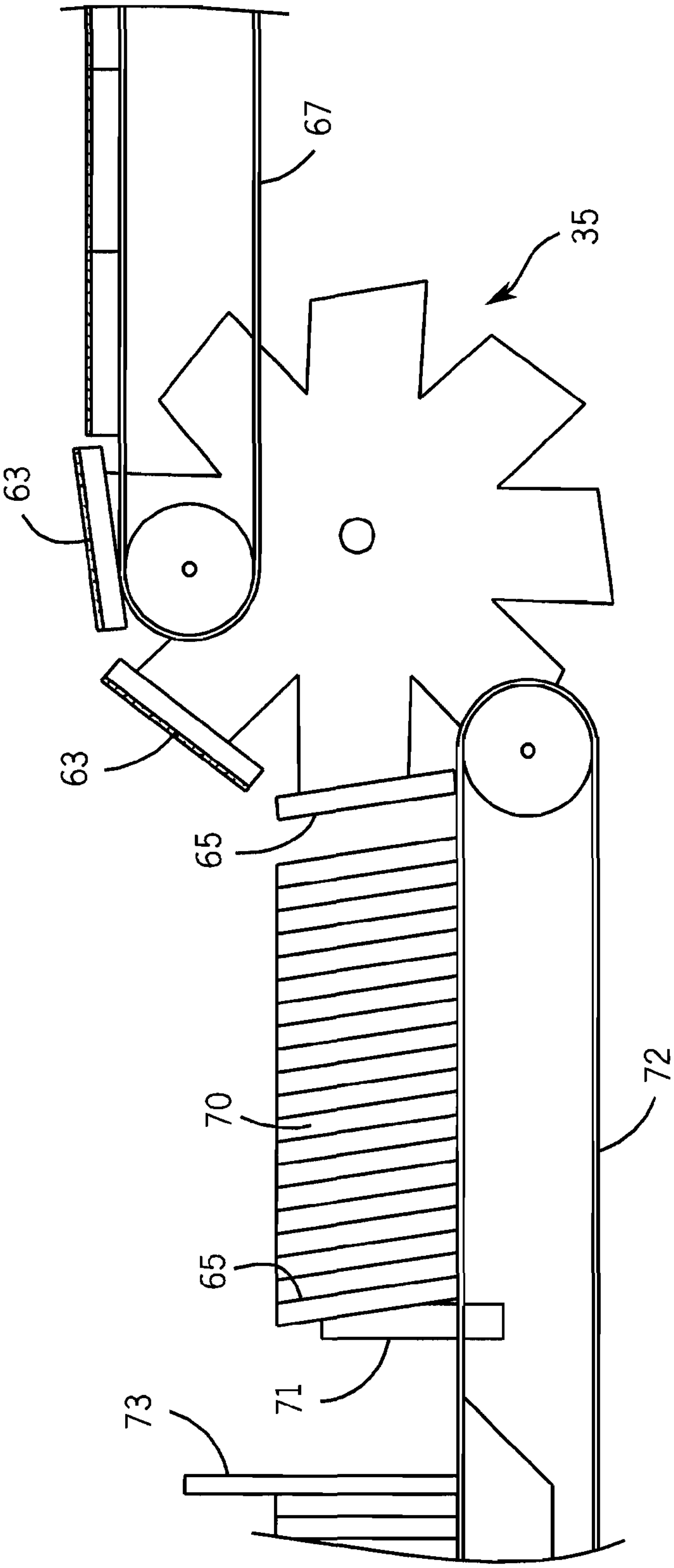
FIG. 11 is a side elevation detail of a preferred embodiment of an upender used in the method of the present invention.

An alternate and presently preferred apparatus for forming a fluted web is shown schematically in FIG. 7. In this embodiment, a lower fluting conveyor 75 is similar to the fluting conveyor 51 of the FIG. 6 embodiment. The flute bars 76 are heated and, in addition, are provided with a vacuum system enabling the formed flutes to be drawn into the valleys between the flute bars. In lieu of an upper fluting conveyor, a spoked fluting roll 77 is used. The fluting roll is provided with a plurality of circumferentially spaced spokes 78 which press the incoming web one flute at a time into the fluting conveyor 75 where the applied vacuum holds the web in position. If two webs of paper or other materials are joined as described with respect to the FIG. 6 embodiment, the vacuum and heat applied to the web downstream of the fluting roll 77 will cure the composite web resulting in a composite fluted web cured and rigid enough for further processing. the exposed flutes of the upper web may have an adhesive applied by a downstream glue roll 80 for the addition of a smooth facing web.

Although a single wall composite web, having one fluted web and one smooth web, can be utilized in the overall process of the present invention, it is preferable to use an open face double wall web such as web 25 used in the process described with respect to FIGS. 1-5. In that process, a full width single face web is slit on its center line and one of the slit halves is turned and moved laterally on a turning bar to be joined with the other web half. However, an open face double wall web may also be formed by joining two full width single face webs each formed on a separate single facer, as will be described in the following preferred embodiment. Regardless of how an open face double wall web is formed, it is important in order to maximize the strength of the core elements to be formed to align the flutes in the joined single face webs so that they are in alignment flute tip-to-flute tip in the double wall web. On the other hand, if a more springy cushioning effect is desired in a core element, the flutes in the two component single face webs may be aligned one half pitch from flute-to-flute alignment or such that the flutes of one composite single face web align with the valleys of the other composite single face web.

Figure 12:
FIGS. 12-14 are cross sectional details of the progressive formation of an open core element from its component webs.
Figure 13:
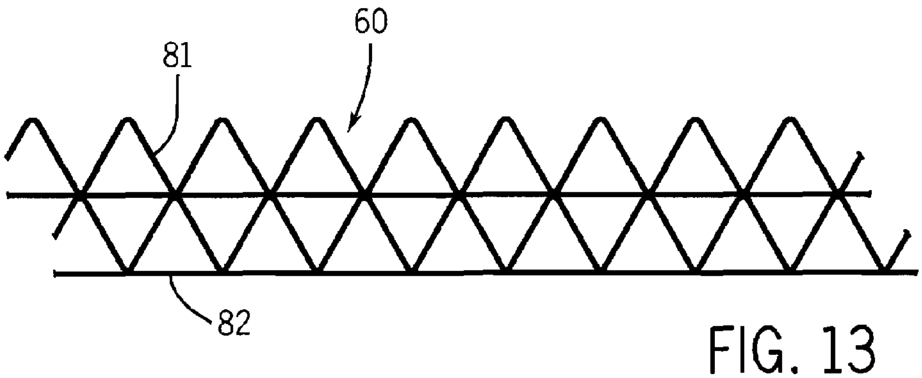

Another embodiment of a system for carrying out the process for the continuous manufacture of open core elements is shown in FIGS. 8-11. The incoming web 60 from the upstream single facer or single facers 59 and 61 may be open face single wall or open face double wall, the later being either full width or half width. Preferably, however, for the reasons stated above, the incoming web 60 is an open face double wall web. A pair of single facers 59 and 61 (or fluted web forming apparatus of FIG. 6 or 7) provide an upper fluted single face web 81 (see the FIG. 12 detail) with its smooth web on the bottom and is joined to a lower fluted single face web 82 (FIG. 12 detail) to the exposed flute tips of which an adhesive has been applied with a glue roll 83. The resulting composite open face double wall web 60 (see the FIG. 13 detail) is heated and cured and brought into the lay-up portion of the system for further processing.

The web 60 is slit in a multi-blade slitting knife 62 into open face double wall strips 63 with the flutes oriented upwardly. As with the previously described process and methods, the width of the strips 63 determines the height or thickness of the finished open core elements. The strips 63 move from the slitting knife under a glue roll 64 where glue is applied to the exposed flute tips. However, in this embodiment one strip is left unglued. The unglued strip 65 may be provided in a number of ways, such as using a laterally movable scraper blade operatively engaging the glue roll to prevent glue from being applied to the unglued strip 65. Successive unglued strips 65 are placed among the strips exiting the glue roll to space between them a selected number of glued strips 63 desired in the finally formed core element. Thus, the unglued strips 65 may not always be in the same lateral position on the strips exiting the glue roll 64 because the desired core element may utilize more or less than the total number strips 63 slit from the incoming web 60.

Each group of strips 63 exiting the glue roll is accelerated on a speed-up conveyor 66 to separate the strips from the next incoming group of strips. The strip group 68 is then cross-transferred onto a lateral feed conveyor 67 where each of the strips now extends laterally across the feed conveyor 67. At the downstream end of the lateral feed conveyor 67, a strip upender 35 identical to the one described with respect to the preceding embodiment, operates to sequentially reorient each strip 63 from a horizontal to a vertical position. Each reoriented strip is positioned with its glued flute tips extending vertically and facing in the downstream direction and is brought into contact with the smooth web on the back of the preceding strip 63.

Figure 14:
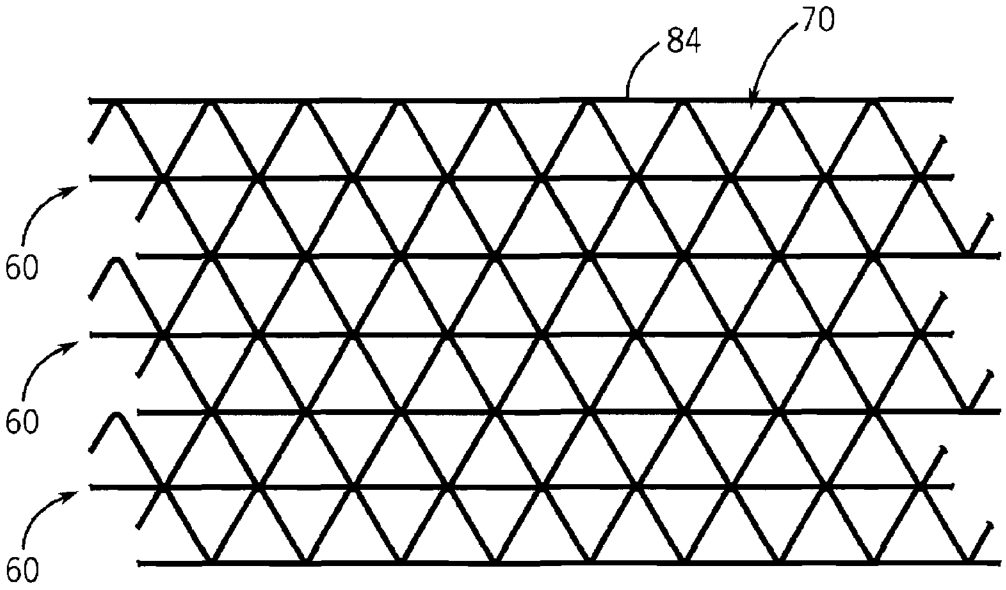

Referring to FIGS. 8-11, each unglued strip 65 forms the lead strip of a hollow core element 70 (see the FIG. 14 detail) of a desired size. The unglued lead strip 65, after it is upended, is brought into contact with a toothed gate 71 operating between the strip upender 35 and the upstream end of an element forming conveyor 72. When a hollow core element 70 is formed, the toothed gate 71 is retracted and the element 72 moves into contact with a downstream compactor plate 73 on the element forming conveyor 72. As the elements 72 move downstream, an upstream compactor plate 74 moves into contact with the smooth web face of the upstream most stream 63 in the formed element 70. Because the downstream compactor plate 73 engages an unglued strip 65 and the upstream compactor plate 74 engages the smooth web face of the last strip which carries no glue, the problem of a strip adhering to the toothed gate 71 or one of the compactor plates 73 or 74 is minimized.

Instead of utilizing an unglued strip 65, it is also possible to insert an unglued sheet of paper 84 which adheres to the glued flute tips of the facing strip and becomes part of the core element 70. Alternately, the face of the downstream compactor plate 73, in the previously described embodiment, may be coated with a non-stick material.

In an alternate method for compacting the formed core elements 70, the element forming conveyor 72 may be angled downwardly to utilize the force of gravity to help press the strips 63 together. In addition, a weighted plate may be inserted against the smooth web face of the rearmost strip of the core element 70.

I claim:

1. A method for continuous manufacture of open core elements, comprising the steps of:

(1) forming two composite web halves each comprising a smooth web and a fluted web;

(2) orienting said composite web halves with the exposed fluted web flutes facing up;

(3) applying an adhesive to the exposed flute tips of one web half;

(4) adhering the other web half by its smooth web to the glued flute tips of said one web half to form an open face double wall web;

(5) slitting the open face double wall web longitudinally to form a plurality of adjacent equal width open face double wall strips;

(6) applying an adhesive to the exposed flute tips of said open face double wall strips;

(7) cutting said strips transversely to a common selected length, and, (8) upending the strips onto common lateral strip edges and adhering the glued flutes of each strip to the smooth web of the next adjacent strip to form an open core element.

2. The method as set forth in claim 1 including, prior to the step of adhering said other web half to said one web half, the step of aligning the flute tips of the web halves tip-to-tip.

3. The method as set forth in claim 1 including, after the step of adhering said other web half to said one web half, the step of heating the open face double wall web to cure the adhesive.

4. The method as set forth in claim 1 including, prior to the upending step, the steps of:

(1) accelerating said strips to form a gap between said strips and the next following plurality of strips; and, (2) cross-transferring said strips out of the path of said next following plurality of strips.

5. The method as set forth in claim 1 including the additional step of applying a normal force to the upended and adhered strips.

6. The method as set forth in claim 1 including the step of cutting the open core element to a selected size.

7. The method as set forth in claim 6 wherein the cutting step comprises at least one of:

(1) cutting one edge of the core element in the longitudinal direction of the strips; and, (2) cutting one end of the core element in a direction transverse to said strips.

8. The method as set forth in claim 1 wherein each of said composite web halves is formed separately.

9. The method as set forth in claim 8 wherein said webs are formed with the fluted web flutes facing downwardly, and including the step of reorienting said webs before applying an adhesive to position the flutes to face upwardly.

10. The method as set forth in claim 1 including the steps of:

(1) forming a double width composite web; and, (2) slitting the double width web to form said two composite web halves.

11. A method for the continuous manufacture of open core elements, comprising the steps of:

(1) forming a composite web comprising at least one smooth web and a fluted web;

(2) orienting said composite web with the fluted web flutes facing up;

(3) slitting the web longitudinally to form a plurality of adjacent equal width strips;

(4) applying an adhesive to the exposed flute tips of said plurality of strips;

(5) cutting said strips transversely to a common selected length; and, (6) upending the strips onto common lateral strip edges and adhering the glued flutes of each strip to the smooth web of the next adjacent strip to form an open core element.

12. The method as set forth in claim 11 including the steps of:

(1) eliminating the application of adhesive to a lead strip for a strip group having a selected number of strips;

(2) supporting the upended lead strip on its unglued face; and, (3) pressing the subsequent upended strips of the group against said lead strip.

13. The method as set forth in claim 12 including the step of orienting the upended strips to form a downwardly directed core element.

14. The method as set forth in claim 13 including the step of inserting a weighted strip on the upper end strip of each core element.

15. The method as set forth in claim 11 including, prior to the upending step, the step of aligning the flute tips on adjacent strips tip-to-tip.

16. The method as set forth in claim 11 wherein the forming step comprises forming two composite webs, and further including the step of joining said webs to form an open face double wall web.

17. The method as set forth in claim 16 including the preliminary steps of:

(1) forming a double width composite web; and, (2) slitting said double width web to form said two composite webs.

18. The method as set forth in claim 16 wherein said composite webs are formed separately.

19. The method as set forth in claim 18 wherein said webs are formed with the fluted web flutes facing downwardly, and including the step of reorienting said webs before joining with the flutes facing upwardly.

20. A method for continuous manufacture of open core elements, comprising the steps of:

(1) forming a composite web from two webs including at least one fluted web;

(2) orienting said composite web with exposed fluted web flutes facing up;

(3) slitting the composite web longitudinally to form a plurality of adjacent equal width strips;

(4) applying an adhesive to the exposed upwardly facing flute tips of said strips;

(5) cutting said strips transversely to a common selected length; and, (6) upending the strips onto common lateral strip edges and adhering the glued flutes of each strip to the next adjacent strip to form an open core element.

* * * * *